(12) United States Patent
Johnson et al.

(10) Patent No.: US 6,388,860 B1
(45) Date of Patent: May 14, 2002

(54) DUAL SWITCH CONTROL SYSTEM

(75) Inventors: Stanley Jerome Johnson, Cedar Falls; Kenneth Julius Essmann, Jr., Waterloo; Sammy John Sablan, Cedar Falls, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/507,098

(22) Filed: Feb. 17, 2000

(51) Int. Cl.[7] ............................................ H01H 47/00
(52) U.S. Cl. ..................... 361/191; 361/160; 361/166
(58) Field of Search ............................... 361/160, 191, 361/166, 167, 168.1, 170, 189; 307/112, 113, 115, 139, 142, 326, 140; 56/10.3, 16.6

(56) References Cited

U.S. PATENT DOCUMENTS

| | | | |
|---|---|---|---|
| 2,613,791 A | * 7/1952 | Eugene | 361/191 |
| 4,102,628 A | 7/1978 | Goff et al. | 431/43 |
| 4,296,591 A | * 10/1981 | Martenas et al. | 56/10.3 |
| 4,760,221 A | 7/1988 | Yoshida et al. | 200/408 |
| 5,921,071 A | * 7/1999 | Paquet et al. | 56/16.6 |
| 5,982,052 A | * 11/1999 | Sosnowski | 307/112 |

OTHER PUBLICATIONS

Deere & Company, "9450, 9550 and 9650 Combines Diagnosis and Tests", pp. i, 240–1, 240–2, 240–15X–1 through 4, Jun. 1999.
Siemens, "POFET BTS611L1—Smart Two Channel Highside Power Switch", p. 1 of 15, Dec. 20, 1996.
Deere & Company, "4720 Forage harvester Operator's Manual", pp. 30–17, published no later than Oct. 1984.
Deere & Company, Operators'Manual—8100—8400 Tractors, p. 45–5, Nov. 1995. Deere & Company, R119123—Diagram, Wiring, Nov. 11, 1993.

* cited by examiner

Primary Examiner—Michael J. Sherry

(57) ABSTRACT

A quick stop circuit for a spring applied quick stop mechanism coupled to an electrically operated actuator includes a dual quick stop switch which includes a simultaneously operated normally open switch and a normally closed switch. The closing of the normally open switch causes control units to turn off a relay which controls energizing of the actuator through an actuator relay. The opening of the normally closed switch de-energizes a quick stop relay which disconnects the driver from its power source, which also de-energizes the actuator relay, which de-energizes the actuator so that the spring applied quick stop mechanism will move to its stop position.

8 Claims, 3 Drawing Sheets

DUAL SWITCH CONTROL SYSTEM

BACKGROUND OF THE INVENTION

The invention relates to a control switch system for controlling a quick stop mechanism, such as for rotating feedrolls of a forage harvester.

Current production forage harvesters have a rotating feedrolls and a feedroll quick stop mechanism which includes a stop pawl which is spring loaded into engagement with a ratcheting wheel of the feedrolls and which is pulled away from the ratcheting wheel by a solenoid during normal machine operation. In order for the feedrolls to rotate, power must be applied to a hold coil of the solenoid and a pull coil of the solenoid must be pulsed to actuate the solenoid. When the solenoid is energized, it pulls the stop pawl away from the ratcheting wheel, thus allowing the feedrolls to turn. This is a fail safe system with respect to electrical failures, in that, when the electrical power to the solenoid is off, the spring holds the pawl in engagement with the ratcheting wheel and the feedrolls are stopped. Such systems are typically equipped with a "quick stop" switch which is used to stop the feedrolls if a problem occurs. A known production John Deere forage harvester has a quick stop system wherein a normally-closed "NC" quick stop switch connected in series with solenoid control relays so that the solenoid will be de-energized when the NC switch is opened. With a single NC switch, the system may not recognize an opening of the NC switch if there is a short circuit between the wires leading to the NC switch.

A known production John Deere combine has a normally-open "NO" quick stop switch, the status of which is scanned by a microprocessor-based control unit. In response to closing the NO quick stop switch, the control unit stops the unloading auger unit and the header engage unit from operating. With such a NO switch, the system may not recognize a closing of the NO switch if there is an open circuit in the wires leading to the NO switch.

It would be desirable to have a quick stop system which can still function properly despite either certain short circuit conditions or certain open circuit conditions.

SUMMARY OF THE INVENTION

An object of the present invention is to provide a quick stop switch system which can still function properly despite either certain short circuit conditions or certain open circuit conditions.

These and other objects are achieved by the present invention, wherein a quick stop circuit for a quick stop mechanism coupled to an electrically operated actuator includes a dual quick stop switch which includes a simultaneously operated normally open switch and a normally closed switch. The closing of the normally open switch causes control units to turn off a relay which controls energizing of the actuator through an actuator relay. The opening of the normally closed switch de-energizes a quick stop relay which disconnects the driver from its power source, which also de-energizes the actuator relay, which de-energizes the actuator so that the spring loaded quick stop mechanism will move to its stop position.

DETAILED DESCRIPTION

Figure 1:
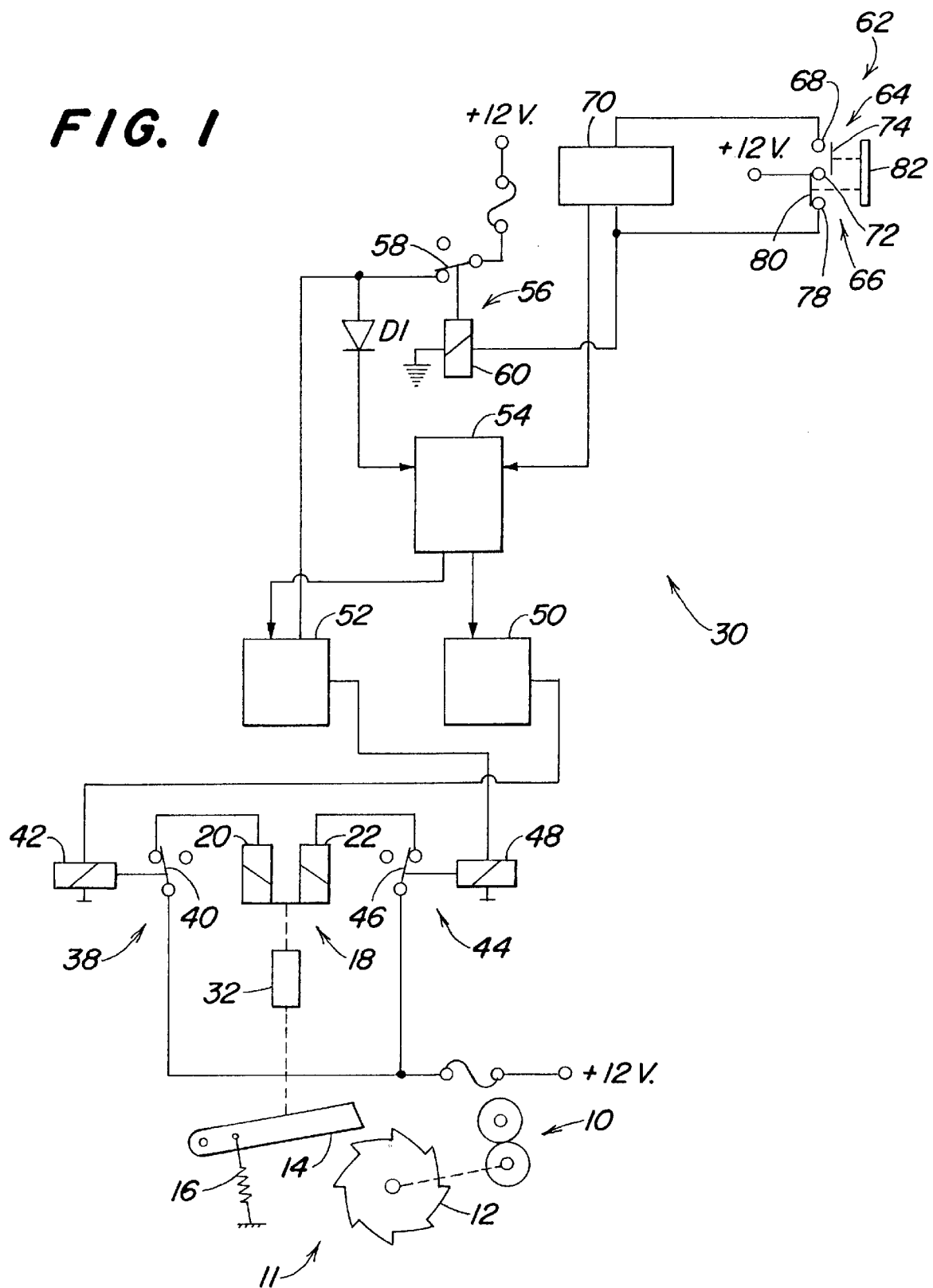
FIG. 1 is a schematic diagram of a quick stop circuit according to the present invention.

A forage harvester has a rotating feedroll 10 and an electrically operated quick stop mechanism 11 which includes a ratchet wheel 12, and a feedroll stop pawl 14 which is biased by a spring 16 into engagement with the ratchet wheel 12, which is pulled away from the ratchet wheel 12 by a solenoid 18 during normal machine operation. The solenoid 18 includes a hold coil 22 and a pull coil 20. In order for the feedroll 10 to rotate, power must be applied to a hold coil 22 and the pull coil 20 must be pulsed to actuate the solenoid 18. When the solenoid 18 is actuated or raised, it pulls the stop pawl 14 away from the ratchet wheel 12, thus allowing the feedroll 10 to turn. This is a fail safe system, in that, when the electrical power to the solenoid 18 is off, the spring 16 holds the pawl 14 in engagement with the ratchet wheel 12 and the feedroll 10 is stopped.

A quick stop circuit 30 controls the energizing of the solenoid 18 of the quick stop mechanism 11. The quick stop circuit 30 is shown in its powered state, that is, the vehicle ignition key (not shown) is on and the machine operating. The solenoid 18 includes an armature 32 which is movable by a pull coil 20 and a hold coil 22. Energizing of the pull coil 20 is controlled by a pull coil relay 38 which includes a relay switch 40 connected between the pull coil 20 and +12 volts and a relay coil 42. Energizing of the hold coil 22 is controlled by a hold coil relay 44 which includes a relay switch 46 connected between the hold coil 22 and +12 volts and a relay coil 48.

A driver unit 50, such as a highside power switch or driver which is commercially available from Siemens, controls the energizing of the relay 38, and driver unit 52 controls the energizing of the relay 44. Driver unit 50 is connected to the +12 volt source and receives a shut-off signal from a microprocessor-based control unit 54. Driver unit 52 is connected to the +12 volt source via a quick stop relay 56 and also receives a shut-off signal from the control unit 54. The functions of control units 54 and 70 could be combined in a single control unit (not shown) instead of separate control units as shown.

Quick stop relay 56 includes a relay switch 58 connected between +12 volts and the driver unit 52 and a relay coil 60. The control unit 54 receives a power status or relay 56 status signal via diode D1.

A dual quick stop switch unit 62 includes a normally open (NO) switch 64 and a normally closed (NC) switch 66. Switch 64 includes with a first contact 68 connected to a switch status unit 70, a second contact 72 connected to +12 volts and a switch member 74. NC switch 66 includes the first contact 72 connected to +12 volts (also a contact of switch 64), a second contact 78 connected to switch status unit 70 and to quick stop relay coil 60, and a switch member 80. Switch members 74 and 80 are mechanically coupled to a common switch member 82, so that when switch member 82 is operated, NO switch 64 closes while simultaneously NC switch 66 opens.

This is a fail safe system. When the power is off, the pawl is down and the feedrolls are stopped. In order for the feed rolls to run, power must be applied to the solenoid hold coil and the pull coil must be pulsed to raise the solenoid. When the solenoid is raised, it removes a stop pawl from a ratcheting wheel allowing the feedrolls to turn.

Figure 2:
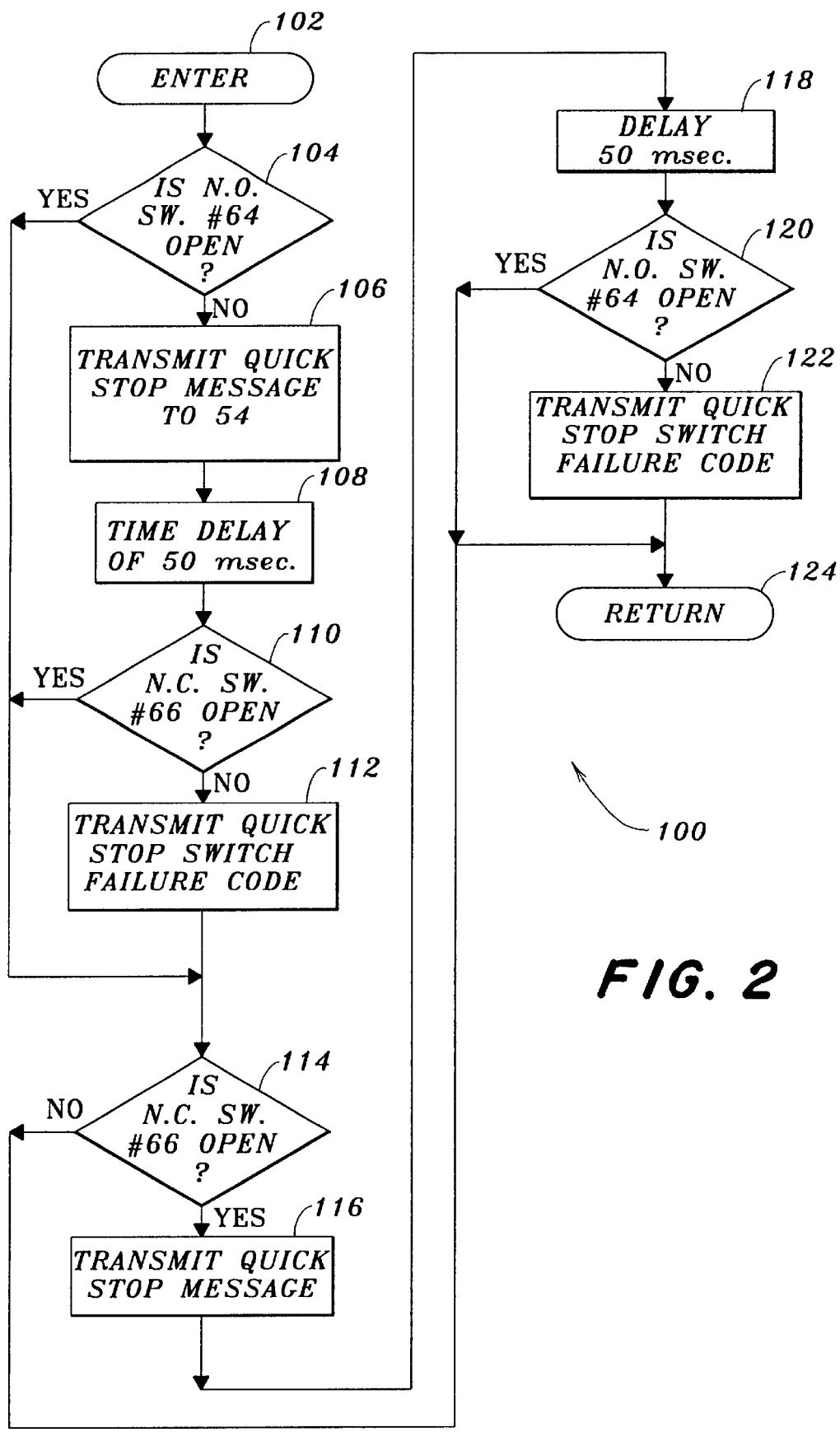
FIGS. 2 and 3 are logic flow diagrams of algorithms executed by control units of FIG. 1.

The control unit 70 executes an algorithm 100 represented by FIG. 2. The algorithm 100 is entered at step 102. Step 104 directs control to step 114 if NO switch 64 is open, else to step 106. Step 106 transmits a quick stop message to control unit 54. Step 108 delays operation for 50 milliseconds.

Step 110 directs control to step 114 if NC switch 66 is open, else to step 112 which transmits a quick stop switch failure code.

Step 114 directs control to step 116 if NC switch 66 is open, else to step 124. Step 116 transmits a quick stop message to control unit 54. Step 118 delays operation for 50 milliseconds. Step 120 directs control to step 124 if the NO switch 64 is open, else to step 122, which transmits a quick stop failure code.

Step 124 exits the algorithm 100.

Figure 3:
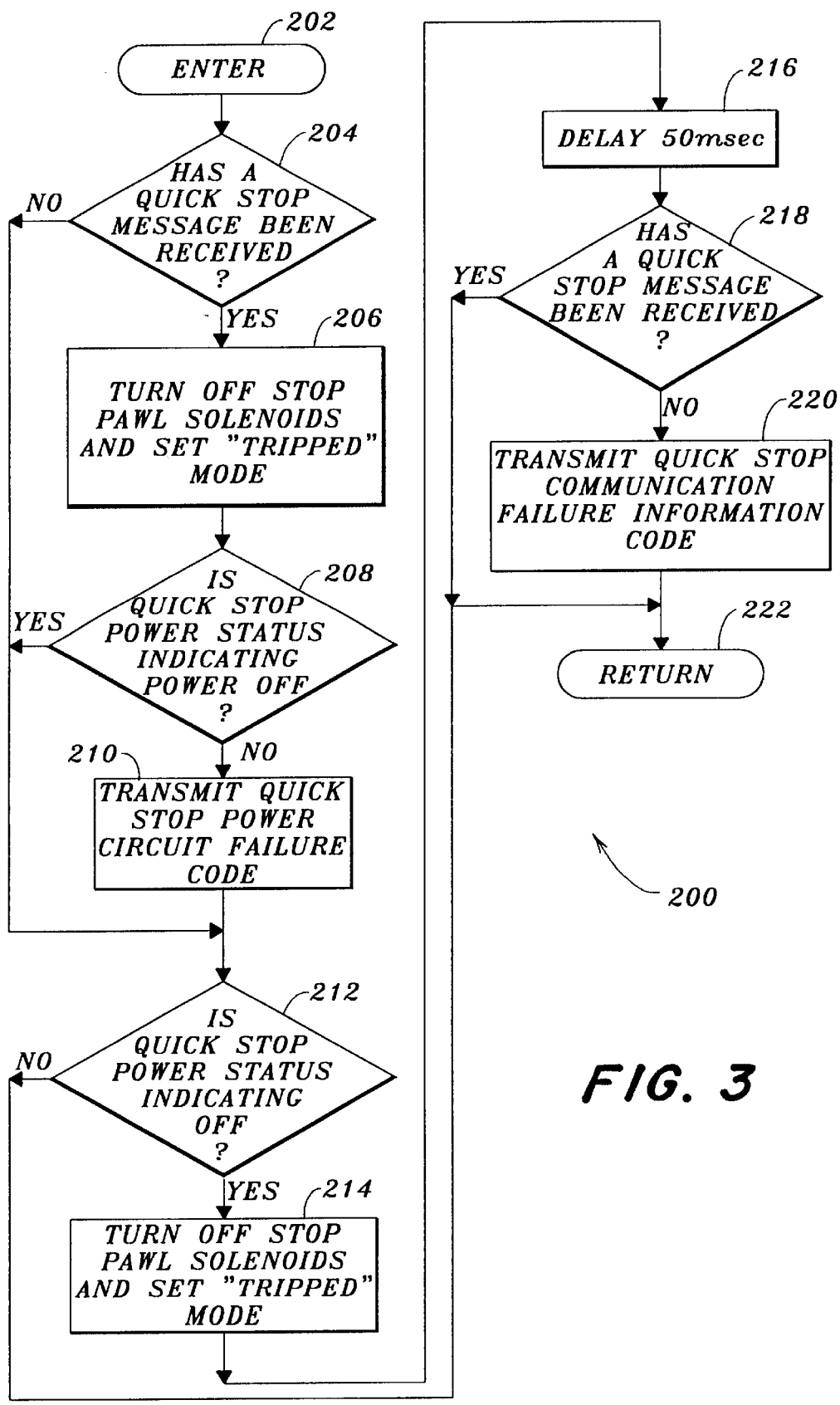

The control unit 54 executes an algorithm 200 represented by FIG. 3. The algorithm is entered at step 202. Step 204 directs control to step 206 if a quick stop message has been received from control unit 70, else to step 212. Step 206 sets a tripped mode value and generates a solenoid turn off command which causes drivers 50 and 52 to turn off relay coils 42 and 48, thus de-energizing solenoid 18 so that pawl 14 will engage ratchet wheel 12 and stop the feedroll 10.

Step 208 directs control to step 212 if the power status signal indicates that the quick stop relay 56 is open, else to step 210. Step 210 transmits a quick stop failure code.

Step 212 directs control to step 214 if the power status signal indicates that the quick stop relay 56 is open, else to step 222.

Step 214, like step 206, sets a tripped mode value and generates a solenoid turn off command which causes drivers 50 and 52 to turn off relay coils 42 and 48, thus de-energizing solenoid 18 so that pawl 14 will engage ratchet wheel 12 and stop the feedroll 10.

Step 216 delays operation for 50 milliseconds.

Step 218 directs control to step 222 if a quick stop message has been received, else to step 220, which transmits a quick stop communication failure code.

Step 222 exits the algorithm 200.

The conversion of the above flow charts into a standard language for implementing the algorithm described by the flow chart in a digital computer or microprocessor, will be evident to one with ordinary skill in the art. The functions of algorithms 100 and 200 could be executed by a single control unit.

MODE OF OPERATION

When power is on to the system and the switches and relays of FIG. 1 are in the condition shown, the pawl 14 will be held away from the ratchet wheel 12 and the feedroll 10 will be permitted to rotate. When the operator depresses switch member 82, this simultaneously closes NO switch 64 and opens NC switch 66. The closing of NO switch 64 causes control units 70 and 54, executing algorithms 100 and 200, respectively, to turn off drivers 50 and 52, thereby turning off relay coils 42 and 48, thus de-energizing solenoid 18 so that pawl 14 will engage ratchet wheel 12 and stop the feedroll 10.

Simultaneously, the opening of NC switch 66 disconnects coil 60 of quick stop relay 56 from the +12 volt voltage source, causing relay 56 to open, thus disconnecting driver 52 from the +12 volt power source. At the same time, control unit 54 turns off both drivers 50 and 52. This also turns off relay coils 42 and 48, thus de-energizing solenoid 18 so that pawl 14 will engage ratchet wheel 12 and stop the feedroll 10.

Thus, if there is an open circuit in the wires leading to NO switch 64, the opening of NC switch 66 will still cause the feedroll 10 to stop. Similarly, if there is a short circuit which interferes with operation of the NC switch 66, the closing of NO switch 64 will still cause the feedroll 10 to stop.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A quick stop circuit for a quick stop mechanism coupled to an electrically operated actuator, the actuator being de-energized to move the quick stop mechanism to a stop position and the actuator being energized to move the quick stop mechanism out of its stop position, the circuit comprising:

a potential source;

a control unit;

a normally closed switch connected between the potential source and the actuator;

a normally open switch having a first terminal connected to the potential source and a second terminal connected to the control unit, the normally closed switch and the normally open switch being simultaneously operable via a common switch member, the control unit generating a shut down control signal in response to closing of the normally open switch and in response to opening of the normally closed switch; and a driver unit which controls energizing of the actuator, the driver unit being operatively connected to the normally closed switch and to the control unit, the driver unit de-energizing the actuator in response to the shut down signal and in response to opening of the normally closed switch.

2. The quick stop circuit of claim 1, further comprising:

a quick stop relay having a quick stop relay switch connected in series between the driver unit and the potential source and a quick stop relay coil operatively coupled to the relay switch and connected between the normally closed switch and ground potential.

3. The quick stop circuit of claim 1, further comprising:

an actuator relay having an actuator relay switch connected in series between the actuator and the potential source and a relay coil operatively coupled to the actuator relay switch and connected between the driver unit and ground potential.

4. The quick stop circuit of claim 1, further comprising:

a quick stop relay having a relay switch connected in series between the driver unit and the potential source and a relay coil operatively coupled to the relay switch and connected between the normally closed switch and ground potential; and an actuator relay having an actuator relay switch connected in series between the actuator and the potential source and a relay coil operatively coupled to the actuator relay switch and connected between the driver unit and ground potential.

5. A control circuit for a mechanism which is placed in a first state by a mechanical device and which is placed in a second state when an electrically operated actuator is energized, the control circuit comprising:

a potential source;

a first relay energizable to connect the actuator to the potential source;

a driver for controlling energizing of the first relay, the driver having a control input and a power input;

quick stop relay energizable to connect the driver power input to the potential source;

a control unit connected to the control input of the driver;

a dual quick stop switch unit having a simultaneously operated normally open switch and a normally closed switch, the normally closed switch being connected between the potential source and the quick stop relay, the normally open switch being connected between the potential source and the control unit, closing of the normally open switch causing the control unit to turn off the driver, opening of the normally closed switch de-energizes the quick stop relay which disconnects the driver power input from potential source.

6. A quick stop circuit for a quick stop mechanism coupled to an electrically operated actuator, the actuator being de-energized to move the quick stop mechanism to a stop position and the actuator being energized to move the quick stop mechanism out of its stop position, the circuit comprising:

a potential source;

a control unit;

a normally closed switch connected between the potential source and the actuator;

a normally open switch having a first terminal connected to the potential source and a second terminal connected to the control unit, the control unit generating a shut down control signal in response to closing of the normally open switch and in response to opening of the normally closed switch;

a driver unit which controls energizing of the actuator, the driver unit being operatively connected to the normally closed switch and to the control unit, the driver unit de-energizing the actuator in response to the shut down signal and in response to opening of the normally closed switch; and a quick stop relay having a quick stop relay switch connected in series between the driver unit and the potential source and a quick stop relay coil operatively coupled to the relay switch and connected between the normally closed switch and ground potential.

7. A quick stop circuit for a quick stop mechanism coupled to an electrically operated actuator, the actuator being de-energized to move the quick stop mechanism to a stop position and the actuator being energized to move the quick stop mechanism out of its stop position, the circuit comprising:

a potential source;

a control unit;

a normally closed switch connected between the potential source and the actuator;

a normally open switch having a first terminal connected to the potential source and a second terminal connected to the control unit, the control unit generating a shut down control signal in response to closing of the normally open switch and in response to opening of the normally closed switch;

a driver unit which controls energizing of the actuator, the driver unit being operatively connected to the normally closed switch and to the control unit, the driver unit de-energizing the actuator in response to the shut down signal and in response to opening of the normally closed switch; and an actuator relay having an actuator relay switch connected in series between the actuator and the potential source and a relay coil operatively coupled to the actuator relay switch and connected between the driver unit and ground potential.

8. A quick stop circuit for a quick stop mechanism coupled to an electrically operated actuator, the actuator being de-energized to move the quick stop mechanism to a stop position and the actuator being energized to move the quick stop mechanism out of its stop position, the circuit comprising:

a potential source;

a control unit;

a normally closed switch connected between the potential source and the actuator;

a normally open switch having a first terminal connected to the potential source and a second terminal connected to the control unit, the control unit generating a shut down control signal in response to closing of the normally open switch and in response to opening of the normally closed switch;

a driver unit which controls energizing of the actuator, the driver unit being operatively connected to the normally closed switch and to the control unit, the driver unit de-energizing the actuator in response to the shut down signal and in response to opening of the normally closed switch;

a quick stop relay having a relay switch connected in series between the driver unit and the potential source and a relay coil operatively coupled to the relay switch and connected between the normally closed switch and ground potential; and an actuator relay having an actuator relay switch connected in series between the actuator and the potential source and a relay coil operatively coupled to the actuator relay switch and connected between the driver unit and ground potential.

* * * * *